(12) United States Patent
Peltier et al.

(10) Patent No.: US 7,819,931 B2
(45) Date of Patent: Oct. 26, 2010

(54) SOIL MEDIUMS AND ALTERNATIVE FUEL MEDIUMS, APPARATUS AND METHODS OF THEIR PRODUCTION AND USES THEREOF

(76) Inventors: Morris Peltier, 508 Prioux St., New Iberia, LA (US) 70563; Foye Sparks, 44 Arboles, Irine, CA (US) 92612

( * ) Notice: Subject to any disclaimer, the term of this patent is extended or adjusted under 35 U.S.C. 154(b) by 787 days.

(21) Appl. No.: 11/809,130

(22) Filed: May 30, 2007

(65) Prior Publication Data

US 2007/0289205 A1 Dec. 20, 2007

Related U.S. Application Data

(63) Continuation-in-part of application No. 10/924,709, filed on Aug. 23, 2004.

(60) Provisional application No. 60/497,062, filed on Aug. 22, 2003.

(51) Int. Cl.
*C10L 8/00* (2006.01)
*C10L 5/40* (2006.01)
*C10L 1/32* (2006.01)

(52) U.S. Cl. .............................. 44/605; 44/628; 44/552; 44/281

(58) Field of Classification Search ................... 44/605, 44/628, 552, 281
See application file for complete search history.

(56) References Cited

U.S. PATENT DOCUMENTS

| | | | |
|---|---|---|---|
| 4,750,454 A | 6/1988 | Santina et al. | |
| 4,759,300 A | 7/1988 | Hansen et al. | |
| 4,798,801 A | 1/1989 | Hitzman | |
| 4,818,405 A | 4/1989 | Vroom | |
| 4,880,533 A | 11/1989 | Hondulas | |
| 4,897,195 A | 1/1990 | Erickson | |
| 5,015,384 A | 5/1991 | Burke | |
| 5,091,315 A | 2/1992 | McCarty et al. | |
| 5,134,944 A | 8/1992 | Keller | |
| 5,269,634 A | 12/1993 | Chynoweth et al. | |
| 5,447,850 A | 9/1995 | McCann | |
| 5,525,239 A * | 6/1996 | Duske | 210/739 |
| 5,527,464 A | 6/1996 | Bartha | |
| 5,616,163 A | 4/1997 | Halfter | |
| 6,387,281 B2 | 5/2002 | Millard et al. | |
| 6,451,589 B1 | 9/2002 | Dvorak | |
| 6,692,544 B1 | 2/2004 | Grillenzoni | |
| 6,866,779 B1 | 3/2005 | Burke | |
| 6,905,600 B2 | 6/2005 | Lee, Jr. | |
| 6,942,798 B2 | 9/2005 | Miller, III | |
| 2003/0121851 A1 | 7/2003 | Lee, Jr. | |
| 2005/0274075 A1 | 12/2005 | Freund | |
| 2005/0274668 A1 | 12/2005 | Lee, Jr. | |
| 2006/0060525 A1 | 3/2006 | Hoffland | |

* cited by examiner

*Primary Examiner*—Michael A Marcheschi
*Assistant Examiner*—Chantel Graham
(74) *Attorney, Agent, or Firm*—Sandra P. Thompson; Buchalter Nemer

(57) ABSTRACT

An apparatus is disclosed for converting sludges, wastes or a combination thereof to biosolids, including a) at least one heated air system, b) at least one trough arrangement, c) at least one auger system, wherein the at least one auger system is situated in the at least one trough arrangement to form a conveyor system, and d) at least one heat box enclosing at least part of the conveyor system. These apparatus can a) efficiently convert organic wastes and sludges into soil mediums or alternative fuel mediums; b) ensure that the soil mediums and alternative fuel mediums are non-odoriferous, non-pathogenic and/or virus-free; c) mass reduce large quantities of organic sludges and wastes; d) mass reduce organic wastes and sludges by a 5 to 1 ratio; e) produce soil mediums or alternative fuel mediums that are or approach Class A or "exceptional quality" rating making them safe to recycle, f) convert both solids and liquids to soil mediums or alternative fuel mediums, where the treated solids can be safely recycled to agriculture markets and liquids can be recycled as washdown water, beneficially recycled for reuse in the manufacturing of the original product or recycled for irrigation, and/or g) reduce or significantly reduce the "footprint" of other conventional waste recycling apparatus by reducing the space/area these devices occupy.

14 Claims, 2 Drawing Sheets

SOIL MEDIUMS AND ALTERNATIVE FUEL MEDIUMS, APPARATUS AND METHODS OF THEIR PRODUCTION AND USES THEREOF

This application is a United States Continuation in Part Application that claims priority to U.S. application Ser. No.: 10/924709 filed on Aug. 23, 2004, which on claims priority to U.S. Provisional Patent Application Ser. No.: 60/497,062 filed on Aug. 22, 2003, where both applications are incorporated by reference in its entirety.

FIELD OF THE SUBJECT MATTER

The field of the subject matter is the conversion of organic waste products into soil mediums or alternative fuel mediums, and specifically the conversion of organic sludges into non-odoriferous, non-pathogenic, relatively virus-free soil mediums or alternative fuel mediums. In addition, the methods and apparatus utilized for this conversion is also described.

BACKGROUND OF THE SUBJECT MATTER

The daily production of millions of tons of various organic wastes and by products annually can be primarily attributed to the operations of municipalities, including the production of sewage and wastewater, and various industries, such as the animal and poultry industries. Waste management costs, coupled with rising interest for resource recovery and environmentally safe practices, have promoted tremendous activity to develop alternative processes and treatment technologies to manage non-hazardous wastes.

Municipalities, for example, produce in excess of 350 million tons of bio-solids each year. At the same time, landfills are diminishing creating future disposal problems. Composting and incineration can be used, but both options are limited in their feasibility. Incineration creates exhaust fumes that can contain components that are damaging to the ozone layer or are considered greenhouse gases. Composting, another alternative, requires less general space than a landfill, but the composting process takes time to work. "Land spreading" is yet another alternative being explored to handle the large amount of the municipality wastes, but the bio-solids are mostly considered Class B wastes that contain pathogens and other enteric bacteria and odor. Also, land spreading is susceptible to runoff, which can be a significant source of pollution, such as ground water pollution.

Paper mills, fish and feed processing wastes approach 150 million tons or more a year. Animal and poultry industries produce at least 100 million tons of waste products per year. These waste products are causing significant concerns because of disposal, concentrated usage and lagoon storage contributes to pollution. The high nutrient values in the water and solids also require expensive treatment methods, which these industries cannot economically afford. In addition, serious health threats can emerge as the result of natural disasters, such as hurricanes or floods, that would give rise to increased pollution, such as that from the hog farms in North Carolina during and after Hurricane Hugo or sewage runoff and spillover after Hurricane Katrina.

Commercial organizations are constantly assessing the potential value of the resources that can be extracted from organic wastes and sludges, especially if the materials are mass reduced because of high moisture content, disinfected of bacteria and viruses and are free of obnoxious odors. The ever increasing waste management costs, coupled with renewed interests for resource recovery and environmentally safe management practices, have promoted interest in alternative management technologies to manage the biosolids from municipal sewage treatment operations and industrial sludges.

The primary source of renewable media are biosolids from municipal sewage treatment operations and industrial organic sludges. Commercial organizations are well aware of the potential value of these resources, if the materials were disinfected of bacteria and viruses, and were free of obnoxious odors. Previously, an effective way of both disinfecting and rendering the biosolids odor neutral has not be available. the biosolids have predominantly been disposed of in landfills, land spread in the immediate area of the waste generator until the soil is over-saturated with nutrients or simply dumped into lagoons or piles. Water runoff and air pollution from these practices contributes to endangerment of public health and general degradation of the quality of life.

Therefore, it would be beneficial to develop an apparatus and process that can a) efficiently convert organic wastes and sludges into soil mediums or alternative fuel mediums; b) ensure that the soil mediums and alternative fuel mediums are non-odoriferous, non-pathogenic and/or virus-free; c) mass reduce large quantities of organic sludges and wastes; d) mass reduce organic wastes and sludges by a 5 to 1 ratio; e) produce soil mediums or alternative fuel mediums that are or approach Class A or "exceptional quality" rating making them safe to recycle, f) convert both solids and liquids to soil mediums or alternative fuel mediums, where the treated solids can be safely recycled to agriculture markets and liquids can be recycled as wash-down water, beneficially recycled for reuse in the manufacturing of the original product or recycled for irrigation, and/or g) reduce or significantly reduce the "footprint" of other conventional waste recycling apparatus by reducing the space/area these devices occupy.

SUMMARY OF THE SUBJECT MATTER

An apparatus is disclosed for converting sludges, wastes or a combination thereof to biosolids, including a) at least one heated air system, b) at least one trough arrangement, c) at least one auger system, wherein the at least one auger system is situated in the at least one trough arrangement to form a conveyor system, and d) at least one heat box enclosing at least part of the conveyor system.

DETAILED DESCRIPTION

Figure 1:
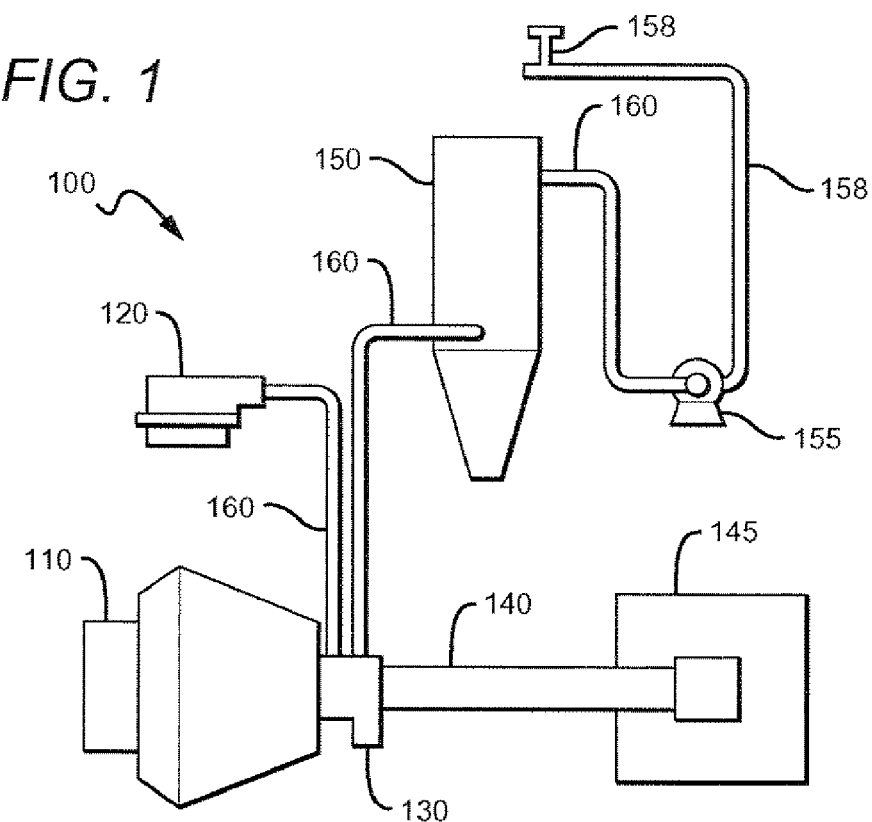
FIG. 1 shows a contemplated arrangement for processing organic wastes and sludges according to the subject matter herein, comprising a mixer coupled to a burner, a product outlet, a food intake and a dust collector by a plurality of conduits or pipes. The food intake is coupled to a hopper, and the dust collector is coupled to an exhaust fan and exhaust conduits or pipes.

In order to address the goals previously mentioned, an apparatus and process have been advantageous developed that can a) efficiently convert organic wastes and sludges into soil mediums or alternative fuel mediums; b) ensure that the soil mediums and alternative fuel mediums are non-odoriferous, non-pathogenic and/or virus-free; c) mass reduce large quantities of organic sludges and wastes; d) mass reduce organic wastes and sludges by a 5 to 1 ratio; e) produce soil mediums or alternative fuel mediums that are or approach Class A or "exceptional quality" rating making them safe to recycle, f) convert both solids and liquids to soil mediums or alternative fuel mediums, where the treated solids can be safely recycled to agriculture markets and liquids can be recycled as wash-down water, beneficially recycled for reuse in the manufacturing of the original product or recycled for irrigation, and/or g) reduce or significantly reduce the "footprint" of other conventional waste recycling apparatus by reducing the space/area these devices occupy. In addition, the apparatus and processes described herein can process up to 10 tons per hour of municipal sewer sludge, can volumetrically reduce wet waste containing as much as 80% moisture by a 5-to-1 margin, can destroy bacteria in temperatures of 200° F. or more, can assure clean emissions, and can produce an end product that meets US EPA 40 CFR Part 503 Regulations as Class "A" or exceptional quality medium.

A process of producing soil mediums or alternative fuel mediums from organic wastes or sludges in a chemical-free environment comprises: a) providing at least one collection of organic wastes or sludges; b) providing a heated air system; c) providing an exhaust system coupled to the heated air system; d) introducing the at least one collection of organic wastes or sludges to the heated air system; e) operating the heated air system in order to convert the at least one collection of organic wastes or sludges to a soil medium or alternative fuel medium; and f) exhausting or removing any dust particles or undesirable gases by utilizing the exhaust system.

Specifically, an apparatus is disclosed for converting sludges, wastes or a combination thereof to biosolids, including a) at least one heated air system, b) at least one trough arrangement, c) at least one auger system, wherein the at least one auger system is situated in the at least one trough arrangement to form a conveyor system, and d) at least one heat box enclosing at least part of the conveyor system.

Once produced, the soil mediums and/or alternative fuel mediums are reduced by at least a 3 to 1 ratio, and in some embodiments by a 4 to 1 ratio, and in yet other embodiments by at least a 5 to 1 ratio. Contemplated processes also disinfect the organic wastes and sludges of bacteria, viruses and remove foul odors, while making the end product safe and recyclable.

Sludges, in general, are produced from the process of treatment of waste water. Due to the physico-chemical processes involved in the treatment, the sludge tends to concentrate heavy metals and poorly biodegradable trace organic compounds as well as potentially pathogenic organisms (viruses, bacteria etc) present in waste waters. Sludge is, however, rich in nutrients such as nitrogen and phosphorous and contains valuable organic matter that is useful when soils are depleted or subject to erosion. The organic matter and nutrients are the two main elements that make the spreading of this kind of waste on land as a fertilizer or an organic soil medium suitable. Municipal sludges are generally the end products of a microbial food chain in the wastewater treatment process.

During the process contemplated herein, at least one collection of organic wastes or sludges is provided. It is contemplated that "a collection" of organic wastes or sludges is a batch of wastes or sludges that are collected from one source, such as a municipality landfill, an animal or poultry plant, a paper mill, the feed or fish processing industries, etc. Therefore, by providing at least one collection of organic wastes or sludges, it is contemplated that there may be organic wastes or sludges from one source or several sources. The terms "provided" or "providing" are used herein to mean that the organic wastes or sludges are released or removed from the source, collection agent or disposal unit to the individual, company, independent contractor or combination thereof who will be processing the organic wastes or sludges. The organic wastes or sludges may also be provided by another treatment facility or pre-treatment facility where the wastes or sludges have been already solidified or conditioned, but that need additional processing. Once the organic wastes or sludges are provided to the entity who will undertake the process contemplated herein, it can be further provided to the heated air system by at least one front end loader, tractor (with bucket and forks), auger, conveyor belt, storage box, storage unit or combination thereof.

Once the organic wastes or sludges are provided, a heated air system is provided that will work to a) efficiently convert organic wastes and sludges into soil mediums or alternative fuel mediums; b) ensure that the soil mediums and alternative fuel mediums are non-odoriferous, non-pathogenic and/or virus-free; c) mass reduce large quantities of organic sludges and wastes; d) mass reduce organic wastes and sludges by a 5 to 1 ratio; e) produce soil mediums or alternative fuel mediums that are or approach Class A or "exceptional quality" rating making them safe to recycle and/or f) convert both solids and liquids to soil mediums or alternative fuel mediums, where the treated solids can be safely recycled to agriculture markets and liquids can be recycled as wash-down water.

It should be understood that a contemplated heated air system is not an incineration device or process. The organic wastes or sludges that are provided will not be incinerated during the heated air part of the process. A contemplated heated air system comprises a heated air dryer, such as the ITS Cyclonic Air Rotary Dryer. Hot air is pumped or forced into the dryer after ambient air is heated to a specific temperature by a burner or other heating device. Contemplated heated air systems are also electronically or digitally operated in order to ensure quality control. In addition to the heated air dryer, it is contemplated that the heated air system comprises a mixer for conditioning or blending the organic wastes or sludges. Contemplated heated air systems, as described herein, are approved processes to reduce pathogens (PFRP), as listed in Chapter 10 of the U.S. EPA Prepared Guidance: "Environmental Regulations and Technology" under 40 CFR, Part 503. In some embodiments, heated air systems comprise at least one burner and at least one hot air blower.

An exhaust system is also provided during contemplated processes, wherein the exhaust system is coupled to the heated air system. The exhaust system is designed to remove and/or exhaust any dust particles or undesirable gases from the process of converting organic wastes or sludges to soil medium or alternative fuel medium. Contemplated exhaust systems may comprise a dust collector, carbon bed filters, low current plasma systems, wet scrubber systems, exhaust fans and combinations thereof. Components of the exhaust system may be connected to one another and to the heated air system by any suitable connection apparatus, including metal pipes, conduits, PVC, plastic or composite pipes or a combination thereof. A closed loop system may also be created in order to recycle air or heat produced by the use of the heated air system. The goal in removing dust particles and/or undesirable gases is to break each component down to the point where they can safely be disposed of or released back into the atmosphere—such as by converting carbon monoxide (CO) to carbon dioxide ($CO_2$). If any particles or undesirable gases that are collected cannot be further broken down in order to make them environmentally acceptable, they should at least be able to be put into solution or properly stored, such that they can be disposed of in a manner that complies with all current Environmental Protection Agency regulations.

The at least one collection of organic wastes or sludges are introduced into the heated air system by methods and apparatus previously described. In one contemplated embodiment, the at least one collection of organic wastes or sludges are introduced into a cement, fertilizer or feed rotary batch mixer operated either horizontally or vertically. The batches may range from about one to about twelve tons or cubic yards in volume of organic wastes or sludges. Organic wastes that have been belt pressed or dewatered may be introduced into the heated air system by any suitable mechanical apparatus, such as those previously described herein. Organic sludges or slurries may be introduced into the heated air system by a pump and conduit.

Once the at least one collection of organic wastes or sludges are introduced into the heated air system, the heated air system is operated in order to convert the at least one collection of organic wastes or sludges to a soil medium or alternative fuel medium. At least part of the heated air system, such as a rotary drum, is rotated while super-heated air is pumped into the heated air system and makes contact with the tumbling waste and/or sludge mass within the drum. The super-heated ambient air is produced by a burner fired from natural gas, diesel, propane or thorough gasification of various products, and is transferred by blower or fan through a duct system into the mixer/rotary drum for a desired period of time. At the same time, air, which includes any dust particles or undesirable gases, is exhausted from the heated air system to the exhaust system by using a blower or fan system, which draws the emissions through a cyclone dust collector and an air scrubber system.

The dried, neutral odor solids—which comprise soil medium and/or alternative fuel medium—are discharged via an auger or closed conveyer system. Because the solids have absorbed heat to temperatures exceeding 176° F., they are now disinfected and meet EPA Class A or Exceptional Quality beneficial reuse parameters, as listed under 40 CFR, Part 503 Regulations.

In another contemplated embodiment, a forced air burner fires into a heat exchange box. The burner fires either propane or natural gas seized from 1 million BTUs per hour to 5 million BTUs per hour. The super-heated air is drafted from the heat exchange box into a heater box that is constructed—in some embodiments—from the same materials as the heat exchange box. The air temperature, as controlled by the electronic burner, flame sensors and regulators, may range from about 150° F. to about 1000° F. In some embodiments, the heated air system heats air to at least about 170° F. In other embodiments, the heated air system heats air to at least about 175° F. The heater box is equipped with a trough arrangement, that may comprise a single or a plurality of double-walled, open top troughs, where each houses a ribbon auger. The trough walls are appropriately spaced from one another and lined in order to prevent oxidation from abrasive heat transfer media, such as salt or rock salt. This heat transfer, along with circulating super heated air, causes quick evaporation of moisture from the sludge tumbling through the troughs or trough arrangement. A constant air suction created from 2500 CFM to a 10000 CFM blower or fan removes the damp air at a set rate caused by displacement of constant incoming super heated "ever circulating" air.

An auger system may be placed as a single auger or as a plurality of augers in diagonally in tiers within the heater box, and the auger system forms the basis for the conveyor system, which comprises the auger system and when operational, at least part of the waste product. The top most auger serves as the feed into the system, as it usually protrudes outside of the heater box. A hopper attached to the outside section of the top auger allows for mechanical introduction of sludge into the top auger. The remaining portion of the top auger carries the sludge slowly to the other end, which is inside the heater box, where an end stop causes the sludge to drop through a chute or hole down to the next auger below. The next auger features two endwalls where each has a protruding shaft. This auger, which is fully contained in the heater box, carries sludge counter current to the incoming air. This auger discharges into a third auger, whose dimensions may be either the same as the first or second augers, depending on whether this auger is responsible for discharging treated sludge outside of the heater box or transferring sludge to another auger inside the heater box. If it is the former, then it will protrude outside of the heater box where the non-odoriferous disinfected and dried sludge, which meets US EPA Class "A" or Exceptional Quality, is discharged into a load-out tube auger or closed conveyor in a conveyor system. For reference, these augers may have any suitable length, including feet, meters, yards or kilometers. In a contemplated embodiment, the auger system comprises 3 augers, where the top most and bottom augers are 18 feet long and the middle auger is 15 feet long.

The augers are operated and manipulated for RPM settings independently by use of a rotational system. In some embodiments, the rotational system comprises a hydraulic pump system, an electronic motor or a combination thereof. In other embodiments, the hydraulic pump system may also be used to operate the air emissions system. The air emissions system comprises a wet scrubber, which removes any particulates drawn out with the air exhausted from the heater box. Any fugitive gases are also condensed into the water. Clean, cool air is then exhausted into the atmosphere. Periodically, such as once or twice a week, the saturated water and solids accumulated by the scrubber are mixed with raw sludge and processed through the dryer system.

Figure 3:
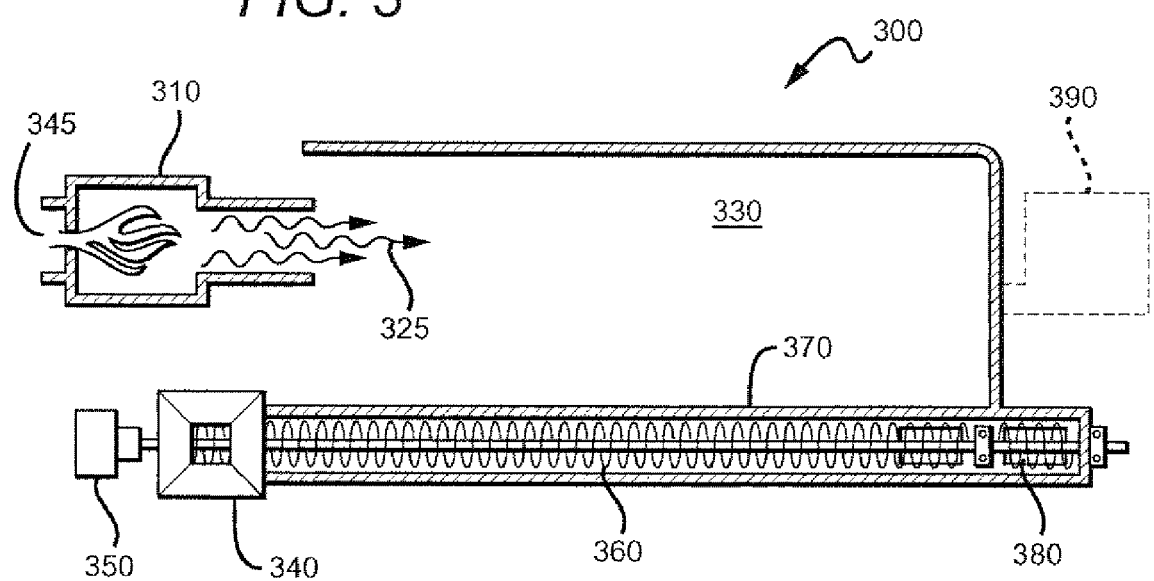
FIG. 3 shows a contemplated single auger system configuration.
Figure 4:
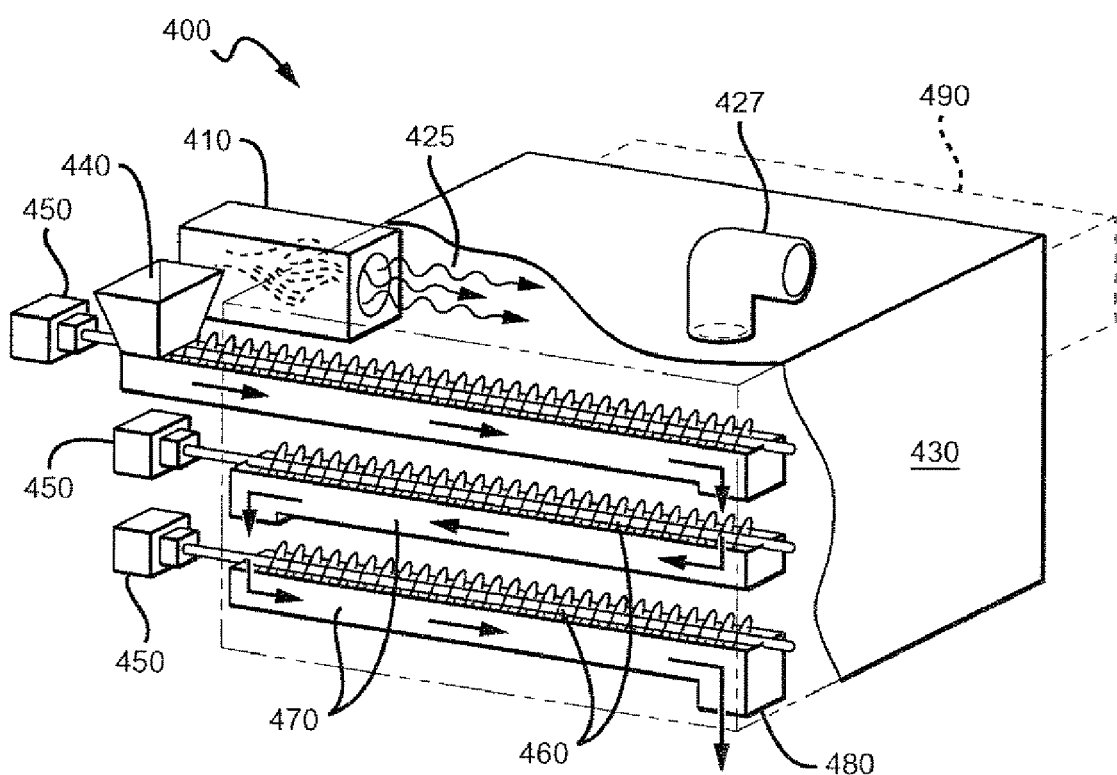
FIG. 4 shows a contemplated plurality auger system configuration.

FIGS. 3 and 4 show contemplated embodiments, where FIG. 3 is a single auger system (300) configuration and FIG. 4 is a plurality auger system configuration, comprising a series of augers. In FIG. 3, a heat exchange box (310) having reinforced walls, which are in this case 4" reinforced walls, and a burner (315) heats air (325) and forces it into a heater box (330). At the same time, sludge (not shown) is put into a feed hopper (340) and forced into the auger system (300) through the action of a hydraulic pump (350). As the sludge enters the heated box (330), it comes in contact with heated air (325) from the heat exchange box (310). The auger (360) inside the heated box (330) is surrounded by a double-walled ceramic coated trough (370). The auger (360) moves the sludge from one end of the heated box (330) to another while the hot air (325) contacts and treats the sludge. Treated sludge then exits the heated box at the discharge end (380). In some embodiments, an optional front feed system can be attached (390).

In FIG. 4, a plurality auger system configuration comprising a series of augers is shown, where the heated box is retrofitted from the single auger embodiment. One could have a single auger system operating separately from the plurality auger system, but these embodiments are designed to show the versatility of the heated box and auger system, if space is at a premium. In FIG. 4, a heat exchange box (410) having reinforced walls, which are in this case 4" reinforced walls, and a burner (not shown) heats air (425) and forces it into a heater box (430). At the same time, sludge (not shown) is put into a feed hopper (440) and forced into the auger system (400) through the action of a series of hydraulic pumps (450). As the sludge enters the heated box (430), it comes in contact with heated air (425) from the heat exchange box (410). The plurality of augers (460) inside the heated box (430) are surrounded by a double-walled ceramic coated troughs (470). The plurality of augers (460) move the sludge from one end of the heated box (430) to the other end and back again (as many times as needed) while the hot air (425) contacts and treats the sludge. Treated sludge then exits the heated box at the discharge end (480). In some embodiments, an optional front feed system can be attached (490). Hot air (425) is discharged from the heater box (430) through a heat discharge opening (427), which may be located in any suitable place on the heater box (430).

In the plurality auger system—an embodiment of which is shown in FIG. 4—the augers may have any suitable size and shape, as mentioned, but in this case the augers are 15" wide in a 17" wide trough that is 15-18 feet long. As should be obvious, the smaller footprint of this embodiment is far superior to conventional systems that must be laid out over large spaces and which take up a considerable amount of space/area.

These components, such as the heat exchange box, the heater box and the augers may be made by any suitable material, which can withstand the temperature ranges and not contaminate the sludge though leaching. In some embodiments, the components are made from steel and/or stainless steel. In other embodiments, some or all of the components, including the trough arrangement, may comprise ceramics. In addition, the auger system may be operated by any suitable system, including a hydraulic pump system, an electronic motor or a combination thereof. In addition, the entire system—including the heat exchange box, the loader, the heater box and the collector may be trailer mounted, so it can be moved around easily or transported to locations where its needed, such as the site of a natural disaster.

Agents that enhance texture, appearance, increased nutrient value, deodorization or a combination thereof may also be added to the processes described and contemplated herein, if necessary. At least part or all of the agents added may be commingled before or after the drying process is conducted.

Contemplated end product user groups are the following industries:

AGRICULTURE: organic farming of vegetables, crops and fruit trees has increased by 20% each of the last 5 years.

HORTICULTURE: nurseries, freeway landscaping, golf courses, landscaping and—the public sector.

SILVICULTURE & LAND RECLAMATION: forest, Christmas trees, landfill cover and road shoulders.

OTHER MARKETS: airports, parks, cemeteries, lawns, gardens, military installations.

ORGANIC CATTLE FEED: the use of organic cattle feed is growing by 10% or more each year.

There are approximately 18 conventional processes, in addition to the novel contemplated embodiments disclosed herein, that address the treatment of biosolids. Of the processes in commercial use, only one of them has "Pathogen Equivalency Committee National Equivalency" status. That particular process is the N-Viro high alkaline treatment. The other processes, shown in Table 1, operate under alternative methods, as outlined in the EPA Part 503 sludge regulations.

TABLE 1

SUMMARY OF BIOSOLIDS TREATMENT PROCESSES

| Treatment Process | Volume Reduction | Pathogen Reduction | Potential for Energy Reduction | Reduction of Pollutants | Final Product | Capital Cost | O & M Cost | Revenue Potential | Environmental Impact |
|---|---|---|---|---|---|---|---|---|---|
| Contemplated Process | Yes, Very High 5:1 ratio | Class A | Significant | Yes | Dried Biosolids, Class A | Low | Low | Very High | Very Low |
| Dewatering | Significant | No | No | No | Dewatered Biosolids | Medium to High | Medium | No | Very Low |
| Air Drying (Up to 3 Mos.) | High | Class B | No | No | Dried Biosolids | Low | Very Low | Very Low | Medium |
| Mesophilic Aerobic Digestion | No | Class B | No | No | Liquid, Class B | Medium | Medium | No | Low |
| Anaerobic Digestion | No | Class B | Significant | No | Liquid, Class B | Medium | Low | Low | Low |
| Thermophilic Aerobic Digestion | No | Class A | No | No | Liquid, Class A | Medium | Low | No | Low |
| Thermophilic Composting | Small Increase | Class A | No | Yes | Compost | Medium to High | Medium | Medium | Medium |
| Mesophilic Composting | Small Increase | Class B | No | Yes | Compost | Medium | Medium | Low | Medium |
| Heat Treatment of Liquid Biosolids | No | Class A | Medium | No | Liquid, Class A | Medium to High | Medium to High | No | Low |
| Pasteurization | No | Class A | No | No | Dewatered, Class A | Low | Medium | No | Low |
| Lime/Alkaline | Small | Class B | No | Yes | Alkaline | Low | Medium | Low | Medium |

TABLE 1-continued

SUMMARY OF BIOSOLIDS TREATMENT PROCESSES

| Treatment Process | Volume Reduction | Pathogen Reduction | Potential for Energy Reduction | Reduction of Pollutants | Final Product | Capital Cost | O & M Cost | Revenue Potential | Environmental Impact |
|---|---|---|---|---|---|---|---|---|---|
| Stabilization Irradiation | Increase No | Class A | No | No | Stabilized Dewatered Biosolids, Class A | No Data | No Data | No | No Data |
| Heat Drying for Autogenious Incineration or Land Application (40-80% TS) | Significant | Class A | Significant | No | Dried Biosolids, Fuel | High | Medium to High | No | Low to Medium |
| Heat Drying & Pelletizing (90% TS) | Significant | Class A | Significant | No | Fertilizer Pellets, Fuel | High | Medium to High | No | Medium |
| Incineration | Highest | N/A | High | N/A | Ash | High to Very High | High | No | Medium |
| Wet Air Oxidation | No | Class A | Medium | Possible | Liquid | High | Medium to High | No | Medium |
| Multi-Effect Evaporation (Carver Greenfield Process) | High | Class A | Medium to High | Possible | Dried Biosolids | Very High | Very High | No | High |
| Pyrolysis (Biosolids to Oil) | Very High | N/A | Low | N/A | Fuel | High | High | Unknown | Medium |
| Melting | Very High | N/A | Medium | N/A | Building Material | High | High | Unknown | High |

In the best of circumstances, only 8 of the 18 listed methods can achieve Class "A" status. The contemplated embodiments disclosed herein have the unique advantage of being the only process that: a) abates obnoxious odors, b) provides complete pathogen destruction, c) has a high capacity, rapid production method, d) has a higher retention of organic nitrogen, which results in a slow release to the soil, f) has a low capital requirement, g) has a low energy requirement, h) has low operating costs, i) has the addition of nitrogen, phosphorus and potassium nutrient value inherent in the process and j) provides a neutral pH product.

The processes described herein a) efficiently convert organic wastes and sludges into soil mediums or alternative fuel mediums; b) ensure that the soil mediums and alternative fuel mediums are non-odoriferous, non-pathogenic and/or virus-free; c) mass reduce large quantities of organic sludges and wastes; d) mass reduce organic wastes and sludges by a 5 to 1 ratio; e) produce soil mediums or alternative fuel mediums that are or approach Class A or "exceptional quality" rating making them safe to recycle and/or f) convert both solids and liquids to soil mediums or alternative fuel mediums, where the treated solids can be safely recycled to agriculture markets and liquids can be recycled as wash-down water. In addition, the processes described herein are individually in a category of EPA approved technologies, but are being utilized herein in a novel fashion. The processes and equipment described herein are designed to be portable, since it would be ideal to be able to move equipment around to deal with the needs of specific areas. The processes described herein render regulatory compliance to generators, and has the capability of reducing pollution on a global scale. The end product of soil mediums and alternative fuel mediums feature significant recycle values on a renewable basis.

EXAMPLES

Example 1

Arrangement for Processing Organic Wastes

Figure 2:
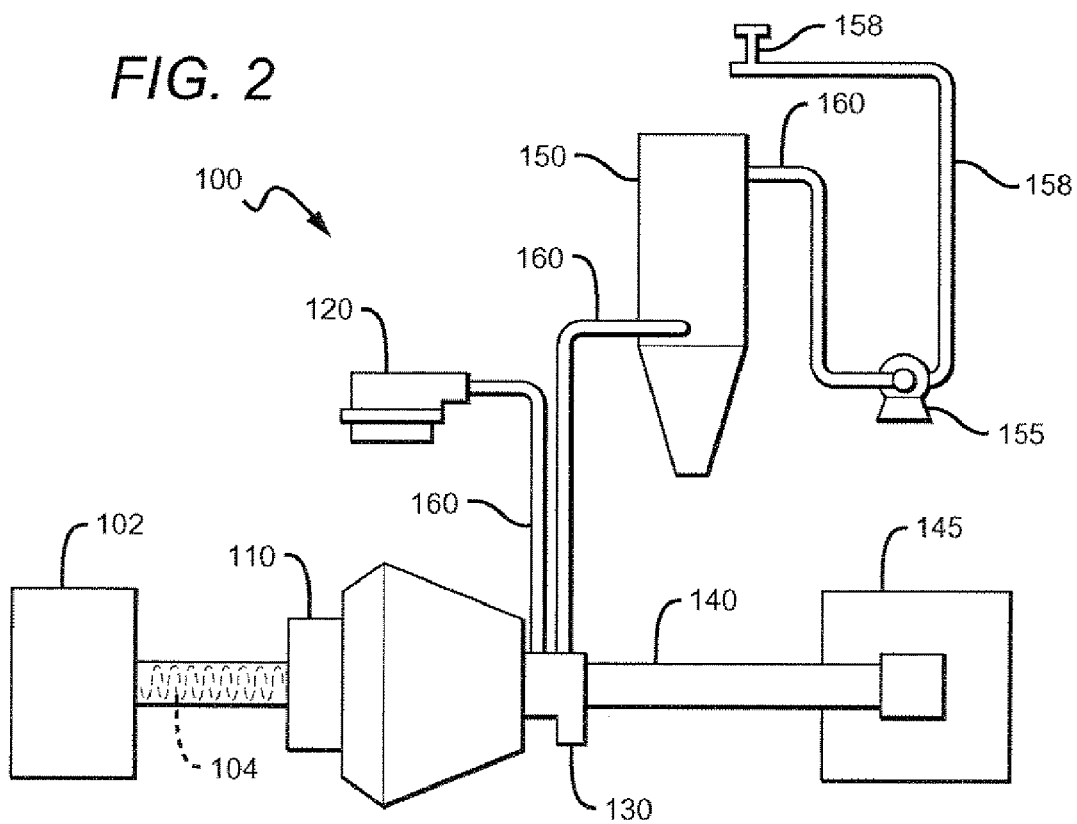
FIG. 2 shows a contemplated arrangement for processing organic wastes and sludges according to the subject matter herein, comprising feed hopper and auger system coupled to a mixer, which is coupled to a burner, a product outlet, a food intake and a dust collector by a plurality of conduits or pipes. The food intake is coupled to a hopper, and the dust collector is coupled to an exhaust fan and exhaust conduits or pipes.

FIG. 1 shows a contemplated arrangement for processing organic wastes and sludges (100) according to the subject matter herein, comprising a mixer (110) coupled to a burner (120), a product outlet (130), a food intake (140) and a dust collector (150) by a plurality of conduits or pipes (160). The food intake (140) is coupled to a hopper (145), and the dust collector (150) is coupled to an exhaust fan (155) and exhaust conduits or pipes (158). FIG. 2 shows a contemplated arrangement for processing organic wastes and sludges (100) according to the subject matter herein, comprising a feed hopper (102) and auger system (104), which is coupled to a mixer (110), which is then coupled to a burner (120), a product outlet (130), a food intake (140) and a dust collector (150) by a plurality of conduits or pipes (160). The food intake (140) is coupled to a hopper (145), and the dust collector (150) is coupled to an exhaust fan (155) and exhaust conduits or pipes (158).

Contemplated arrangements such as the one shown in FIG. 1 addresses the needs of municipalities, animal and poultry as well as industrial waste generators. The system mass reduces the waste, disinfects it of bacteria, viruses and foul odor while making the end product safe and recyclable as a soil medium.

Example 2

High Point, North Carolina Sludge Process Test

A municipal bio-solids sludge drying event conducted on Jun. 16, 2003 in High Point, N.C., produced a Class A and exceptional quality product which can be profitably recycled in the organic soil medium market.

A Las Vegas, Nev.-based company utilized a modified rotary drum dryer to process approximately 40 tons of the wet sewer sludge provided by the City of Winston-Salem's wastewater treatment plant. While processing at a rate of 12 tons per hour, the final product equaled or exceeded all test parameters as established by the U.S. Environmental Protection Agency (see Tables 2-6).

This "exceptional quality" status is sometimes impossible to achieve because sludge qualities can be adversely affected by industrial by-products which are present in some waste systems.

Two independent laboratories were involved in certifying the U.S. EPA Part 503, 40 CFR data as well as determining that the nutrient-rich product was virtually unchanged by the process. The process also resulted with a 5-to-1 mass reduction, eliminating moisture from a level of almost 80 percent to 1.5 percent. This reduction alone greatly impacts a cost reduction for the need to transport and dispose of the sludge.

The process demonstration was conducted with the permission of the North Carolina Department of Environmental Quality, bio-solids and air quality departments, as well as respective departments from the City of Winston-Salem.

TABLE 2

| Parameter | Unit | Discharge Chute 1 | Discharge Chute 2 | Feed Bin 3 Raw |
|---|---|---|---|---|
| % Water | Percent | 16.7 | 0.6 | 77 |
| pH | SU | 7.11 | 5.79 | 7.66 |
| Fec. Coli-MF | MPN/g TS | <2 | <2 | ≧700,000 |
| TVS | Percent | 14.4 | 13.3 | 15.4 |
| TS | Percent | 83.3 | 99.4 | 23.0 |
| Sodium, Total | mg/kg | 761 | 61.6 | 1580 |
| Copper, Total | mg/kg | 139 | 73.6 | 318 |
| Antimony, Total | mg/kg | <60.0 | 50.3 | <217 |
| Mercury, Total | mg/kg | <0.240 | 0.443 | <0.870 |
| Chromium, Total | mg/kg | 56.8 | 27.9 | 120 |
| Zinc, Total | mg/kg | 493 | 266 | 1150 |
| Lead, Total | mg/kg | 44.1 | 24.6 | 106 |
| Iron, Total | mg/kg | 12000 | 4310 | 18600 |
| Aluminum, Total | mg/kg | 6890 | 2310 | 10000 |
| SOUR | mg $O_2$/hr/g | 0.4 | 0.2 | 0.9 |

SU = Standard Units
SOUR = Specific Oxygen Uptake Rate
MPN/g TS = Most Probable Number per gram Total Solids
mg $O_2$/hr/g = milligrams of oxygen per hour per gram
mg/kg = milligrams per kilogram = parts per million

TABLE 3

| Parameter | Unit | Discharge Chute 4 | Discharge Chute 5 | Discharge Chute 6 | Discharge Chute 7 | Discharge Chute 8 |
|---|---|---|---|---|---|---|
| Fec. Coli - MF | MPN/g TS | <2 | <2 | <2 | 19 | <2 |
| % Water | Percent | 1.10 | 6.6 | 1.5 | 33.1 | 1/0 |

TABLE 4

| Parameter | Unit | Discharge Chute 1 | Discharge Chute 2 |
|---|---|---|---|
| Arsenic, Total | mg/kg | <12.0 | <10.1 |
| Copper, Total | mg/kg | 1.38 | <1.01 |
| Molybdenum, Total | mg/kg | <24.0 | <20.1 |
| Nickel, Total | mg/kg | 20.0 | 15.0 |
| Selenium, Total | mg/kg | <12.0 | <10.1 |

TABLE 5

Processed Balance - Plus Humus

| Constituent | Unit | Analysis (As Received) | Total (lb/ton) | lb/ton Available - First Year |
|---|---|---|---|---|
| Nitrogen | | | | |
| Organic Nitrogen | % N | 0.20 | 3.91 | 1.37 |
| Ammonium - Nitrogen | % N | 0.00 | 0.08 | 0.08 |
| Nitrate - Nitrogen | % N | 0.016 | 0.32 | 0.32 |
| Total Nitrogen | % N | 0.22 | 4.31 | 1.77 |
| Major & Secondary Nutrients | | | | |
| Phosphorus | % $P_2O_5$ | 0.50 | 10.08 | 9.07 |
| Potassium | % $K_2O$ | 0.30 | 6.00 | 6.00 |
| Calcium | % Ca | 0.68 | 13.60 | 13.60 |
| Magnesium | % MgO | 0.32 | 6.30 | 6.30 |
| Sulfur | % S | 0.07 | 1.40 | 0.49 |
| Sodium | % Na | 0.022 | 0.44 | 0.44 |
| Micronutrients | | | | |
| Zinc | ppm Zn | 78 | 0.16 | 0.08 |
| Iron | ppm Fe | 7626 | 15.25 | 7.63 |
| Manganese | ppm Mn | 335 | 0.67 | 0.33 |
| Copper | ppm Cu | 75 | 0.15 | 0.07 |
| Boron | ppm B | 5 | 0.01 | 0.00 |
| Other Properties | | | | |
| Moisture | % | 3.7 | | |
| Solids | % | 96.3 | | |
| Organic Matter | % | 5.6 | 112.81 | |
| Ash | % | 90.7 | 1814.16 | |
| Carbon:Nitrogen | | 15 | | |
| EC (1:5 Extract) | mmho/cm | 0.8 | | |
| pH | | 7.1 | | |

Available: Values in this column are the estimated nutrient amounts available during the first year following application. Use these values to calculate fertilizer credits for crop production.
Nitrogen: All of the urea, ammonium and nitrate plus a portion of the organic nitrogen are considered available during the growing season following application. If material is broadcast on the soil surface and not incorporated shortly about ¼ to ⅓ of the urea and ammonium nitrogen may be lost through volatilization.
Carbon:Nitrogen: Nitrogen immobilization may occur if the carbon:nitrogen ratio is 30 or greater. Immobilization causes nitrogen deficiency if large amounts of organic materials are incorporated just prior to crop planting.

TABLE 6

Raw Humus

| Constituent | Unit | Analysis (As Received) | Total (lb/ton) | lb/ton Available - First Year |
|---|---|---|---|---|
| Nitrogen | | | | |
| Organic Nitrogen | % N | 0.36 | 7.16 | 2.51 |
| Ammonium - Nitrogen | % N | 0.00 | 0.09 | 0.09 |
| Nitrate - Nitrogen | % N | 0.026 | 0.53 | 0.53 |
| Total Nitrogen | % N | 0.39 | 7.78 | 3.13 |
| Major & Secondary Nutrients | | | | |
| Phosphorus | % $P_2O_5$ | 1.12 | 22.44 | 20.20 |
| Potassium | % $K_2O$ | 0.46 | 9.12 | 9.12 |
| Calcium | % Ca | 1.83 | 36.60 | 36.60 |
| Magnesium | % MgO | 0.50 | 9.95 | 9.95 |
| Sulfur | % S | 0.13 | 2.56 | 0.90 |
| Sodium | % Na | 0.035 | 0.70 | 0.70 |
| Micronutrients | | | | |
| Zinc | ppm Zn | 104 | 0.21 | 0.10 |
| Iron | ppm Fe | 9781 | 19.56 | 9.78 |
| Manganese | ppm Mn | 513 | 1.03 | 0.51 |
| Copper | ppm Cu | 52 | 0.10 | 0.05 |
| Boron | ppm B | 7 | 0.01 | 0.01 |
| Other Properties | | | | |
| Moisture | % | 14.3 | | |
| Solids | % | 85.7 | | |
| Organic Matter | % | 11.2 | 223.64 | |
| Ash | % | 74.6 | 1491.20 | |
| Carbon:Nitrogen | | 16 | | |
| EC (1:5 Extract) | mmho/cm | 1.1 | | |
| pH | | 7.2 | | |

Available: Values in this column are the estimated nutrient amounts available during the first year following application. Use these values to calculate fertilizer credits for crop production.
Nitrogen: All of the urea, ammonium and nitrate plus a portion of the organic nitrogen are considered available during the growing season following application. If material is broadcast on the soil surface and not incorporated shortly about ¼ to ⅓ of the urea and ammonium nitrogen may be lost through volatilization.
Carbon:Nitrogen: Nitrogen immobilization may occur if the carbon:nitrogen ratio is 30 or greater. Immobilization causes nitrogen deficiency if large amounts of organic materials are incorporated just prior to crop planting.

Thus, specific embodiments and applications of soil mediums and alternative fuel mediums, apparatus and methods of their production and uses thereof have been disclosed. It should be apparent, however, to those skilled in the art that many more modifications besides those already described are possible without departing from the inventive concepts herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A process of producing soil mediums from organic wastes or sludges, comprising:

providing at least one collection of organic wastes or sludges;
providing a heated air system;
providing an exhaust system coupled to the heated air system;
introducing the at least one collection of organic wastes or sludges to the heated air system;
operating the heated air system in order to convert the at least one collection of organic wastes or sludges comprising as much as 80% moisture content to a soil medium, wherein the at least one collection of organic wastes or sludges is mass reduced by a ratio of 5 to 1 to form the soil medium and wherein the soil medium has a Class A rating according to US EPA 40 CFR Part 503; and
exhausting any dust particles or undesirable gases by utilizing the exhaust system.

2. The process of claim 1, wherein the at least one collection of organic wastes or sludges originates from a municipality, an animal or poultry facility, a paper mill or a combination thereof.

3. The process of claim 2, wherein the at least one collection of organic wastes or sludges comprises at least one liquid, at least one slurry, at least one solid or a combination thereof.

4. The process of claim 1, wherein the heated air system comprises at least one rotary drum.

5. The process of claim 1, wherein the heated air system heats air to at least about 150° F.

6. The process of claim 1, wherein the exhaust system comprises at least one wet scrubber, at least one dust collector, at least one plasma system, at least one carbon bed or a combination thereof.

7. The process of claim 1, wherein mass reducing the at least one collection of organic wastes or sludges to form the soil medium comprises removing moisture from the at least one collection of organic wastes or sludges.

8. The process of claim 1, wherein the heated air system heats air to at least about 170° F.

9. The process of claim 1, wherein the heated air system heats air to at least about 175° F.

10. The process of claim 1, further comprising collecting a plurality of dust particles, at least one undesirable gas or a combination thereof from the exhaust system.

11. The process of claim 1, wherein exhausting comprises removing a plurality of dust particles, at least one undesirable gas or a combination thereof from the heated air system.

12. The process of claim 10, further comprising disposing of the plurality of dust particles, the at least one undesirable gas or the combination thereof in accordance with EPA Regulations.

13. The process of claim 11, further comprising disposing of the plurality of dust particles, the at least one undesirable gas or the combination thereof in accordance with EPA Regulations.

14. The process of claim 1, wherein the exhaust system comprises at least one blower, fan or combination thereof.

* * * * *